United States Patent
Niu et al.

(10) Patent No.: US 9,664,913 B2
(45) Date of Patent: May 30, 2017

(54) ARRAY SUBSTRATE, 3D DISPLAY PANEL AND 3D DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Lei Niu, Shanghai (CN); Yuhong Tao, Shanghai (CN); Zhangben Wu, Shanghai (CN); Zhihua Ling, Shanghai (CN); Jun Ma, Shanghai (CN); Xingchen Wang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 262 days.

(21) Appl. No.: 14/304,736

(22) Filed: Jun. 13, 2014

(65) Prior Publication Data
US 2015/0160463 A1    Jun. 11, 2015

(30) Foreign Application Priority Data
Dec. 10, 2013    (CN) .......................... 2013 1 0666662

(51) Int. Cl.
G02F 1/1335    (2006.01)
G02B 27/22    (2006.01)

(52) U.S. Cl.
CPC ................. *G02B 27/2214* (2013.01)

(58) Field of Classification Search
CPC .................. G02B 27/2214; H04N 13/0404

USPC .......................................................... 349/15
See application file for complete search history.

(56) References Cited

U.S. PATENT DOCUMENTS

2012/0229456 A1*  9/2012  Takahashi .......... H04N 13/0404
                                                                 345/419
2013/0120366 A1   5/2013  Lee et al.

FOREIGN PATENT DOCUMENTS

CN            102736292 A        10/2012

OTHER PUBLICATIONS

Office Action received in corresponding Chinese Application No, 201310666662.8, dated Sep. 6, 2015.

* cited by examiner

*Primary Examiner* — Nathanael R Briggs
*Assistant Examiner* — William Peterson
(74) *Attorney, Agent, or Firm* — Alston & Bird LLP

(57) ABSTRACT

The invention discloses an array substrate, a 3D display panel and a 3D display device. The array substrate includes a plurality of sub-pixel units arranged in an array. Each of the sub-pixel units has a shape of a non-equilateral parallelogram having two short sides and two long sides. The two short sides are the top side and the bottom side. The sub-pixel units in a same row are inclined in the same direction at a same inclination angle with respect to a vertical direction. The top sides of the sub-pixel units in the same row lie on a straight line. The projection of the top side of each of the sub-pixel units in the vertical direction lies on and overlaps with the bottom side of an adjacent sub-pixel unit.

17 Claims, 4 Drawing Sheets

ARRAY SUBSTRATE, 3D DISPLAY PANEL AND 3D DISPLAY DEVICE

CROSS-REFERENCES TO RELATED APPLICATIONS

This application claims the benefit of priority to Chinese Patent Application No. 201310666662.8, filed with the Chinese Patent Office on Dec. 10, 2013 and entitled "ARRAY SUBSTRATE, 3D DISPLAY PANEL AND 3D DISPLAY DEVICE", the content of which is incorporated herein by reference in its entirety.

FIELD OF THE INVENTION

The present invention relates to the field of 3D display technologies, and more particularly to an array substrate, a 3D display panel and a 3D display device.

BACKGROUND OF THE INVENTION

Stereo display technologies can roughly fall into a glasses-type stereo display and an automatic stereo display, where no specially designed watching device (e.g., specially designed glasses or helmet) is required to be worn by a viewer for the automatic stereo display, also referred to as a naked-eye stereo display. With the naked-eye stereo display technology, the same image is projected respectively into the left eye and the right eye of a watcher by using a grating device, where there are different parallaxes for the image projected into the left eye and the right eye for the purpose of a stereo display effect. Specifically, taking a slit grating as an example, there is a distance between the grating and a 3D display panel, so different combinations of pixels can be seen respectively by the left and right eyes through slits, thus different images are projected into the left and right eyes, as illustrated in FIG. 1A.

However, the slits of the slit grating may be arranged in an area with more display zones or may be arranged in an area with more non-display zones, and when the slits of the grating are arranged in the area with more display zones, there may be a brighter display effect in the area, and when the slits of the grating are arranged in the area with more non-display zones, there may be a darker display effect in the area, so alternating brighter and darker fringes, that is, Moire fringes, tend to appear in the overall display effect.

With the naked-eye stereo display technology above, the Moire fringes are typically alleviated using the following solution:

In the display panel, there is a transverse displacement, which is an irrational number multiple of the width of a pixel unit, of each row of pixel units on an array substrate relative to a preceding row of pixel units, so that the ratio of display zones to non-display zones in the slits of the grating becomes more uniform, to alleviate the Moire fringes.

However, the inventors of the invention have identified that in the foregoing solution, there is a transverse displacement, which is an irrational number multiple of the width of a pixel unit, of each row of pixel units relative to a preceding row of pixel units, so the pixels may be arranged non-uniformly, thus resulting in periodical non-uniform brightness in the vertical direction (i.e., the column direction). As illustrated in FIG. 1B, with respective rows of pixel units in the vertical direction and the same reference straight line L in that direction, lengths of line segments formed by the respective pixel units R, G and B intersecting with the straight line are different. This also means that there are unequal display zones (which may be considered as the line segments) for the respective pixel units R, G and B along the reference straight line L, for example, the pixel units R, G and B identified by the reference number 1 appear reddish, and the pixel units R, G and B identified by the reference number 2 appear greenish, so there may be non-uniform brightness of the pixel units R, G and B in the direction in which the straight line extends, thus resulting in Moire fringes and influencing a display effect.

BRIEF SUMMARY OF THE INVENTION

An object of the invention is to provide an array substrate, a 3D display panel and a 3D display device, so as to make the brightness of respective R/G/B pixel units in the vertical direction uniform, alleviate the Moire fringes and improve a 3D display effect.

The object of the invention is attained by the following technical solutions:

An embodiment of the invention provides an array substrate including:

a plurality of sub-pixel units arranged in the form of array, wherein each of the sub-pixel units is a non-equilateral parallelogram, the top side and the bottom side of each of the sub-pixel units are shorter sides of the non-equilateral parallelogram, and the same row of respective sub-pixel units are inclined in the same direction;

the top sides of the respective sub-pixel units in the same row of sub-pixel units lie on a straight line, and the bottom sides of the respective sub-pixel units lie on a straight line; and the projection of the top side of each of the sub-pixel units in the vertical direction lies on and overlaps with the bottom side of an adjacent sub-pixel unit, and the projection of the bottom side of the sub-pixel unit in the vertical direction lies on and overlaps with the top side of another adjacent sub-pixel unit; and for any two of the sub-pixel units, a straight line perpendicular to the top sides of the two sub-pixel units intersects with one end of the top side of each of the two sub-pixel units and the side of each of the two sub-pixel units opposite to the end respectively, to form equal line segments, wherein the end is the vertex of the obtuse angle adjacent to the top side.

Advantageous effects of the embodiment of the invention are as follows: the same row of sub-pixel units are inclined in the same direction; and the projection of the top side of each sub-pixel unit in the vertical direction lies on and overlaps with the bottom side of an adjacent sub-pixel unit, and the projection of the bottom side of the sub-pixel unit in the vertical direction lies on and overlaps with the top side of another adjacent sub-pixel unit, thereby resulting in more uniform ratio of display zones to non-display zones in slits of a grating when cooperating with the grating, periodically uniform brightness in the vertical direction (i.e., the column direction), alleviating the Moire fringes and improving a 3D display effect.

An embodiment of the invention provides a 3D display panel including two paired box substrates and liquid crystals arranged between the two paired box substrates, wherein one of the paired box substrates is the array substrate according to the foregoing embodiment of the invention.

Embodiments of the invention provide many advantages: the same row of sub-pixel units in the array substrate are inclined in the same direction, and the projection of the top side of each sub-pixel unit in the vertical direction lies on and overlaps with the bottom side of an adjacent sub-pixel unit, and the projection of the bottom side of the sub-pixel unit in the vertical direction lies on and overlaps with the top side of another adjacent sub-pixel unit, thereby resulting in periodically uniform brightness in the vertical direction (i.e., the column direction), alleviating the Moire fringes and improving a 3D display effect.

An embodiment of the invention provides a 3D display device, including a grating configured to project different images respectively into the left eye and the right eye, wherein the 3D display device includes the 3D display panel according to the foregoing embodiment of the invention.

Advantageous effects of the embodiments of the invention are as follows: resulting in a more uniform ratio of display zones to non-display zones of the array of pixels in slits of the grating, periodically uniform brightness in the vertical direction (i.e., the column direction), alleviating the Moire fringes and improving a 3D display effect.

DETAILED DESCRIPTION OF THE INVENTION

Figure 1A:
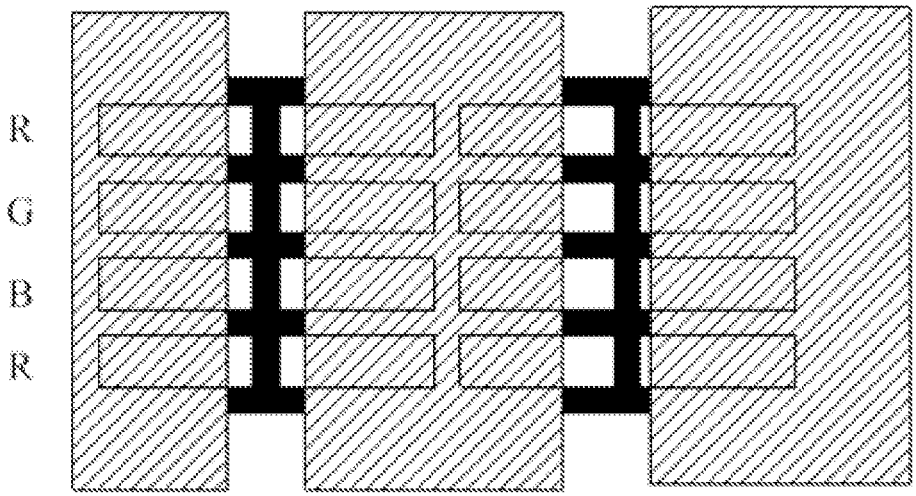
FIG. 1A and FIG. 1B are schematic structural diagrams of an array substrate for 3D display in the prior art.
Figure 1B:
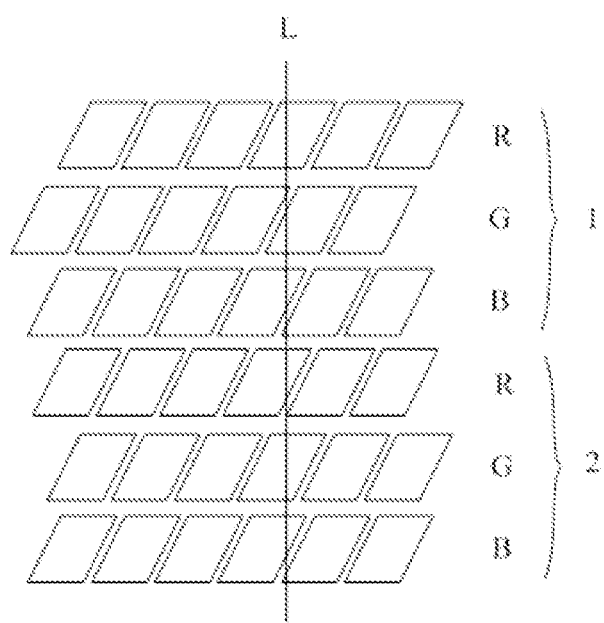

With respect to the naked-eye stereo display technology above, there can be a transverse displacement, which is an irrational number multiple of the width of a pixel unit, of each row of pixel units on an array substrate relative to a preceding row of pixel units, so that the ratio of display zones to non-display zones in slits of a grating becomes more uniform, to alleviate the Moire fringes. However, there is a transverse displacement, which is an irrational number multiple of the width of a pixel unit, of each row of pixel units relative to a preceding row of pixel units, so the pixels may be arranged non-uniformly, thus resulting in periodical non-uniform brightness in the vertical direction (i.e., the column direction), that is, non-uniform brightness of the R/G/B pixel units in the zones in the vertical direction, so that there may be Moire fringes. In order to alleviate the Moire fringes, embodiments of the invention provide an array substrate, in which the structure of sub-pixel units is changed, so that the ratio of display zones to non-display zones in slits of a grating is uniform and there is periodically uniform display brightness in the vertical direction after the grating is arranged. Implementations of the embodiment of the invention will be described below with reference to the drawings. It shall be noted that identical or similar reference numerals will denote identical or similar elements or functionally identical or similar elements throughout the drawings. The embodiments described below with reference to the drawings are illustrative and merely intended to explain the invention but shall not be construed as limiting the invention.

Figure 2:
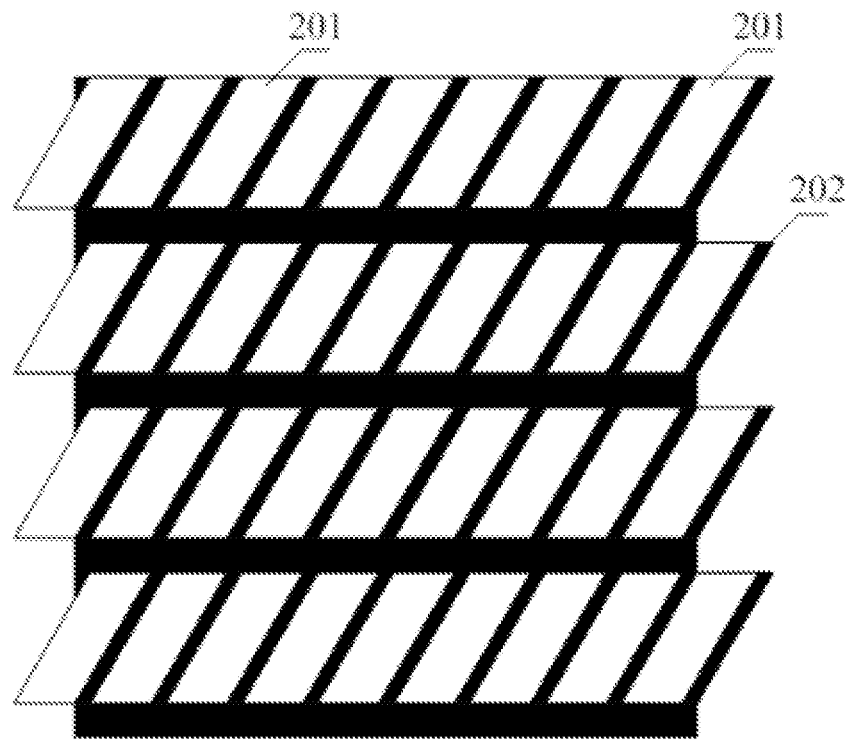
FIG. 2 is a schematic structural diagram of an array substrate according to an embodiment of the invention.

FIG. 2 is a schematic structural diagram of an array substrate according to an embodiment of the invention. The array substrate includes a plurality of sub-pixel units 201 arranged in the form of array and a plurality of black matrixes 202 arranged between the sub-pixel units 201. The sub-pixel unit 201 is a non-equilateral parallelogram having two short sides and two long sides. The two short sides are the top side and the bottom side of the non-equilateral parallelogram. The sub-pixel units 201 in a same row are inclined in the same direction (at a same inclination angle with respect to the vertical direction).

The top sides of the respective sub-pixel units 201 in the same row lie on a first straight line (in the horizontal direction), and the bottom sides of the respective sub-pixel units 201 lie on a second straight line (in the horizontal direction); and the projection of the top side of each sub-pixel unit 201 in the vertical direction lies on and overlaps with the bottom side of an adjacent sub-pixel unit 201, and the projection of the bottom side of the sub-pixel unit 201 in the vertical direction lies on and overlaps with the top side of another adjacent sub-pixel unit 201.

For any two of the sub-pixel units 201, a straight line perpendicular to the top side of one of the two sub-pixel units 201 intersects an end of the top side and a long side of the one of the two sub-pixel units 201 opposite to the end to form a first line segment, and a straight line perpendicular to the top side of the other one of the two sub-pixel units 201 intersects an end of the top side and a long side of the other one of the two sub-pixel units 201 opposite to the end to form a second line segment, where a length of the first line segment is equal to a length of the second line segment, where the end is the vertex of the obtuse angle adjacent to the top side.

In an embodiment of the invention, there is periodically uniform brightness of the sub-pixel units 201 in the vertical direction, to alleviate the Moire fringes and improve a 3D display effect.

Figure 3:
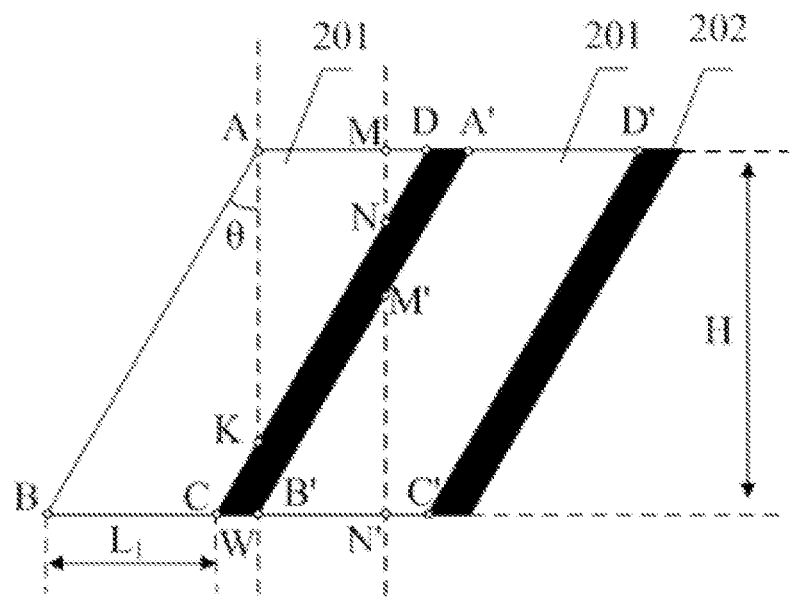
FIG. 3 is a schematic structural diagram of sub-pixel units according to an embodiment of the invention.

FIG. 3 is a schematic structural diagram of sub-pixel units according to an embodiment of the invention. Two adjacent sub-pixel units 201 and a black matrix 202 between the two adjacent sub-pixel units 201 are shown in FIG. 3. The two sub-pixel units 201 include a vertex A, a vertex B, a vertex C and a vertex D, and a vertex A', a vertex B', a vertex C' and a vertex D', respectively. In an embodiment, the angle θ formed between a long side of the sub-pixel unit 201 and a vertical line satisfies the following equation:

$$\tan \theta = (L_1 + W)/H,$$

Where θ is the angle between the long side of the sub-pixel unit 201 and the vertical line; $L_1$ is the length of the top side or the bottom side of the sub-pixel unit; W is the distance between two adjacent ends of the top sides of the two adjacent sub-pixel units 201 or the distance between two adjacent ends of the bottom sides of the two adjacent sub-pixel units 201; and H is the distance between the top side and the bottom side of the sub-pixel unit 201.

The projection of the top side AD of one of the sub-pixel units 201 in the vertical direction lies on and completely overlaps with the bottom side B'C' of the other sub-pixel unit 201 in the direction in which the sub-pixel units 201 are inclined, where the vertex A and the vertex B' lie on a vertical line. In an embodiment of the invention, the vertex of the obtuse angle formed by the top side and a long side of one of the sub-pixel units 201 and the vertex of the acute angle formed by the bottom side and a long side of the adjacent sub-pixel unit 201 lie on a vertical line in the direction in which the sub-pixel units are inclined. Within a row of sub-pixel units 201, a vertical line can be located at any locations of the row, where there are equal valid display zones of the sub-pixel units 201 crossed (passed) by the vertical line. Referring to FIG. 3, a first vertical line crosses (passes) a first sub-pixel unit 201 to define a line segment AK, and a second vertical line crosses (passes) the two sub-pixel units 201 to define line segments MN and M'N', where the length of the line segment AK is equal to the total length (sum) of the line segments MN and M'N'.

Figure 4:
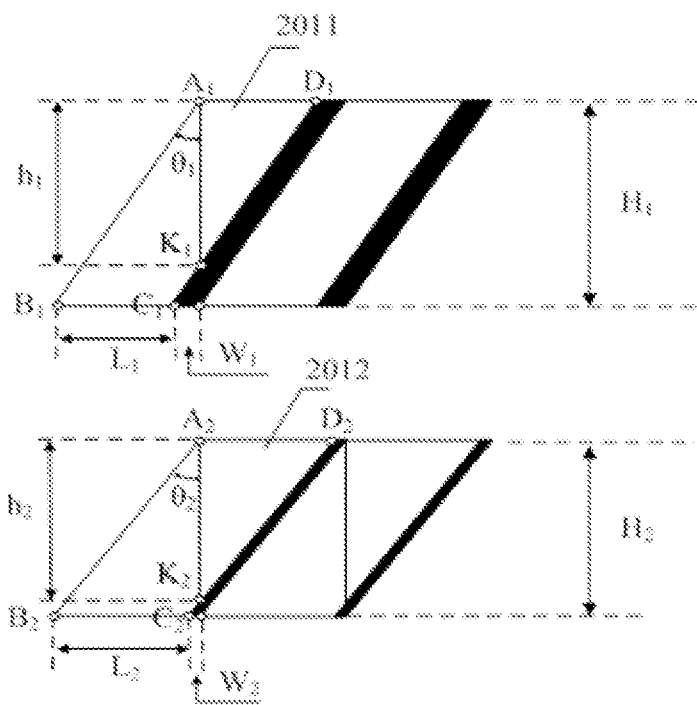
FIG. 4 is a schematic structural diagram of two sub-pixel units with different heights according to an embodiment of the invention.
Figure 5:
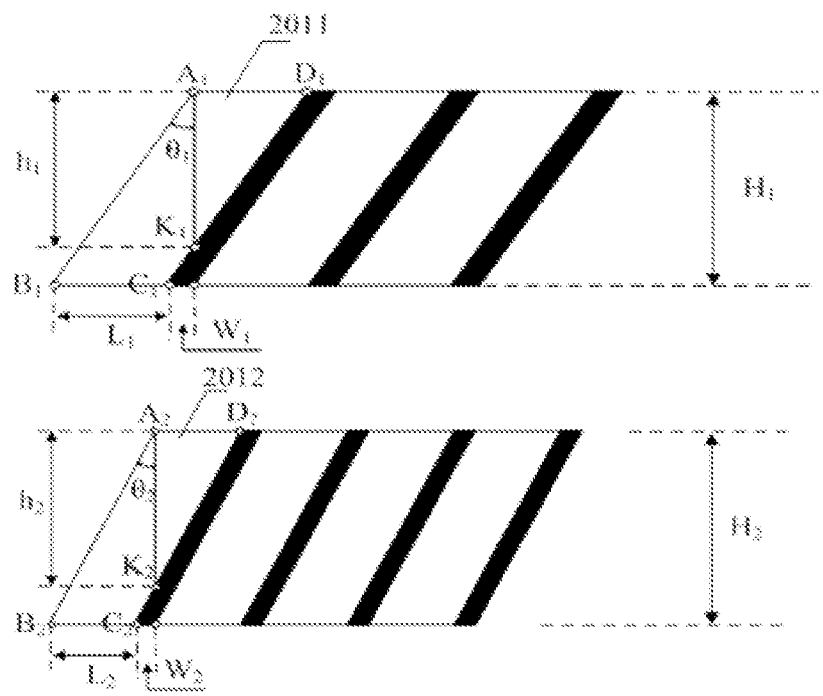
FIG. 5 is a schematic structural diagram of two sub-pixel units with the same height and different widths according to an embodiment of the invention.

Thus, there is such a condition that for any two sub-pixel units, a straight line perpendicular to the top sides of the two sub-pixel units 201 intersects an end of the top side of each of the two sub-pixel units 201 and the side of each of the two sub-pixel units 201 opposite to the end respectively to form equal line segments, where the end is the vertex of the obtuse angle adjacent to the top side. There can be periodically uniform brightness of an array of sub-pixels in the vertical direction in the case that this condition is satisfied for different rows of sub-pixel units 201. Reference can be made to FIG. 4 and FIG. 5 illustrating schematic structural diagrams of sub-pixel units for the sake of a clearer description.

Reference is made to FIG. 4 illustrating a sub-pixel unit 2011 and a sub-pixel unit 2012 in different rows and with different heights, where there are vertexes (corner points) $A_1$, $B_1$, $C_1$ and $D_1$ of the sub-pixel unit 2011 and vertexes (corner points) $A_2$, $B_2$, $C_2$ and $D_2$ of the sub-pixel unit 2012. The sub-pixel unit 2011 and the sub-pixel unit 2012 may or may not be located in adjacent rows. The height of the sub-pixel unit 2011 is $H_1$, the lengths of the top side $A_1D_1$ and the bottom side $B_1C_1$ are $L_1$, the distance (space) between two adjacent sub-pixel units is $W_1$, a straight line perpendicular to the top side $A_1D_1$ passes the vertex $A_1$ and intersects with the side to form a line segment $A_1K_1$ with a length $h_1$, and the angle formed between the side $A_1B_1$ and $A_1K_1$ is $A_1$; and the height of the sub-pixel unit 2012 is $H_2$, the lengths of the top side $A_2D_2$ and the bottom side $B_2C_2$ are $L_2$, the distance (space) between two adjacent sub-pixel units is $W_2$, a straight line perpendicular to the top side $A_2D_2$ passes the vertex $A_2$ and intersects with the long side to form a line segment $A_2K_2$ with a length $h_2$, and the angle formed between the side $A_2B_2$ and $A_2K_2$ is $\theta_2$, where $L_1+W_1$ is equal to $L_2+W_2$.

Further reference is made to FIG. 5 illustrating a sub-pixel unit 2011 and a sub-pixel unit 2012 in different rows and with the same height, where there are vertexes $A_1$, $B_1$, $C_1$ and $D_1$ of the sub-pixel unit 2011 and vertexes $A_2$, $B_2$, $C_2$ and $D_2$ of the sub-pixel unit 2012. The sub-pixel unit 2011 and the sub-pixel unit 2012 may or may not be located in adjacent rows. The height of the sub-pixel unit 2011 is $H_1$, the lengths of the top side $A_1D_1$ and the bottom side $B_1C_1$ are $L_1$, the distance (space) between two adjacent sub-pixel units is $W_1$, a straight line perpendicular to the top side $A_1D_1$ passes the vertex $A_1$ and intersects the long side to form a line segment $A_1K_1$ with a length $h_1$, and the angle formed between the side $A_1B_1$ and $A_1K_1$ is $\theta_1$; and the height of the sub-pixel unit 2012 is $H_2$, the lengths of the top side $A_2D_2$ and the bottom side $B_2C_2$ are $L_2$, the distance (space) between two adjacent sub-pixel units is $W_2$, a straight line perpendicular to the top side $A_2D_2$ passes the vertex $A_2$ and intersects the long side to form a line segment $A_2K_2$ with a length $h_2$, and the angle formed between the side $A_2B_2$ and $A_2K_2$ is $\theta_2$, where $H_1$ is equal to $H_2$, $L_1$ is not equal to $L_2$, $W_1$ is not equal to $W_2$, and $L_1+W_1$ is not equal to $L_2+W_2$.

The lengths h1 and h2 can be described using the following Equation (1) and Equation (2):

$$h_1 = H_1 - W_1 * \cot \theta_1 \qquad (1)$$

$$h_2 = H_2 - W_2 * \cot \theta_2 \qquad (2)$$

The sub-pixel unit 2011 and the sub-pixel unit 2012 shall satisfy $h_1$ being equal to $h_2$. There are the following various arrangement combinations of sub-pixel units while satisfying $h_1$ being equal to $h_2$:

In an example embodiment, different rows of sub-pixel units may be as illustrated in FIG. 4, where the heights $H_1$ and $H_2$ are different, the angles $\theta_1$ and $\theta_2$ are not equal, the widths $L_1$ and $L_2$ are not equal, and the distances $W_1$ and $W_2$ between every two adjacent sub-pixel units are not equal, but $L_1+W_1$ is equal to $L_2+W_2$.

In another example embodiment, different rows of sub-pixel units may be as illustrated in FIG. 5, where the heights $H_1$ and $H_2$ are equal, but the angles $\theta_1$ and $\theta_2$ are not equal, the widths $L_1$ and $L_2$ are not equal, and the distances $W_1$ and $W_2$ between every two adjacent sub-pixel units are not equal.

In yet another example embodiment, different rows of sub-pixel units may be the sub-pixel unit 2012 as illustrated in FIG. 4 and the sub-pixel unit 2012 as illustrated in FIG. 5, where the heights $H_1$ and $H_2$ are not equal, the angles $\theta_1$ and $\theta_2$ are not equal, the widths $L_1$ and $L_2$ are not equal, and the distances $W_1$ and $W_2$ between every two adjacent sub-pixel units are not equal.

With respect to the foregoing combinations of sub-pixel units, in an application to a display device with a grating and within a fixed grating width, when m sub-pixel units 2011 as illustrated in FIG. 5 are arranged in a grating and n sub-pixel units 2012 as illustrated in FIG. 5 are arranged in another grating, $L_1+W_1$ is not equal to $L_2+W_2$, so m is not equal to n, where m and n are natural numbers. Of course, there are equal numbers of sub-pixel units 2011 and sub-pixel units 2012 as illustrated in FIG. 4 within a fixed grating width.

It shall be noted that the foregoing embodiments are merely intended to illustrate various combinations of sub-pixel units but not to exhaust their combinations, and there may be numerous combinations while satisfying the condition of $h_1$ being equal to $h_2$ for different rows of sub-pixel units, but they will not be enumerated here. Sub-pixel units and respective combinations of sub-pixel units which will occur to those skilled in the art without departing from the spirit of the invention shall come into the claimed scope of the invention.

Preferably, the width of the black matrix 202 between two adjacent sub-pixel units 201 is equal to the width of the spacing between the two adjacent sub-pixel units 201.

Moreover, the sub-pixel units 201 are inclined in a direction which can be set in rows.

For example, reference is made to FIG. 2 illustrating a schematic structural diagram of the array substrate, where all the sub-pixel units 201 are inclined in the same direction, so that when the sub-pixel units 201 are shielded by a grating, the ratio of display zones to non-display zones in slits of the grating is uniform, and there is periodically uniform brightness of the resulted array of sub-pixels in the vertical direction.

Figure 6:
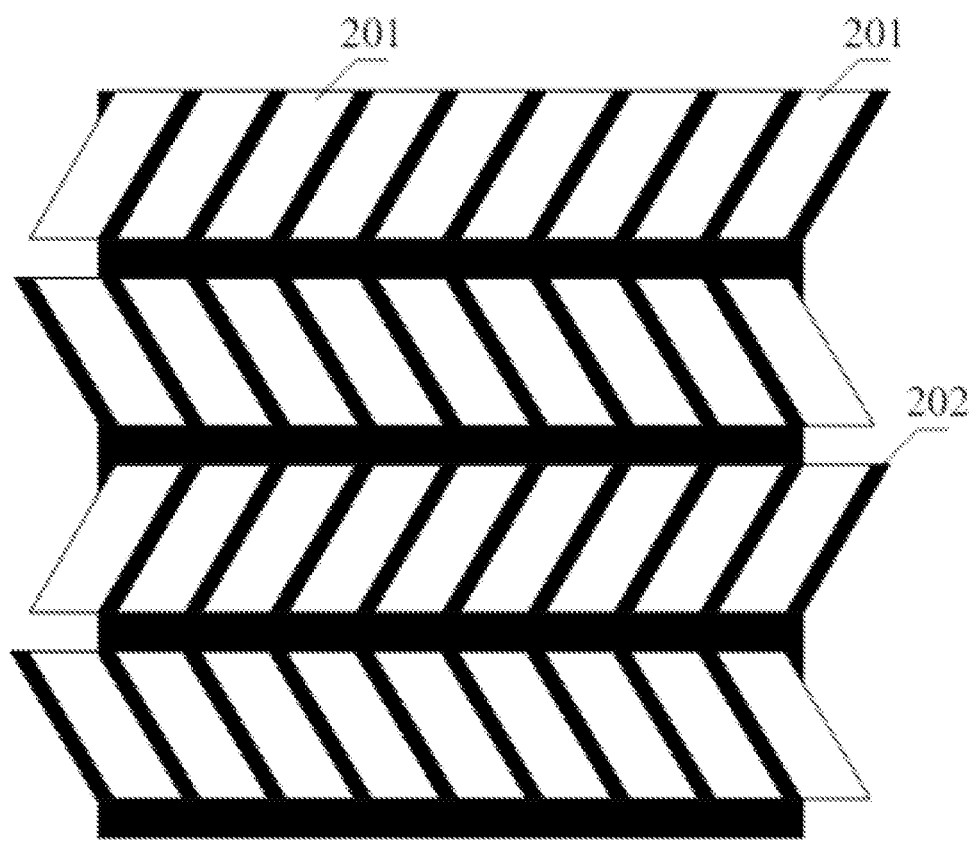
FIG. 6 is a schematic structural diagram of another array substrate according to an embodiment of the invention.

FIG. 6 is a schematic structural diagram of an array substrate according to an embodiment of the present invention. The difference between the structure of the array substrate of FIG. 6 and the structure of the array substrate of FIG. 2 is that two adjacent rows of sub-pixel units 201 are inclined in opposite directions. Since respective sub-pixel units 201 in each row of sub-pixel units 201 are inclined in the same direction, the ratio of display zones to non-display zones in slits is still uniform and there is periodically uniform brightness of the formed array of sub-pixels in the vertical direction when two adjacent rows of sub-pixel units 201 are inclined in opposite directions.

In another example embodiment, N adjacent rows of sub-pixel units 201 may formed a set of sub-pixel units 201, in which the sub-pixel units 201 are inclined in the same direction, where N is an integer greater than or equal to 2. N adjacent rows of sub-pixel units 201 in an adjacent set are inclined in opposite directions. In other words, alternate sets of N adjacent rows of sub-pixel units 201 are inclined in opposite directions. The structure of the array substrate illustrated in FIG. 6 can be a variant of the array substrate illustrated in FIG. 2, and thus a repeated illustration thereof will be omitted herein. In this embodiment, the ratio of display zones to non-display zones in slits is uniform and there is periodically uniform brightness of the resulted array of sub-pixels in the vertical direction.

In the foregoing respective embodiments, the sub-pixel units 201 may be branch pixel units of a pixel unit; or the sub-pixel units 201 may be formed by dividing a pixel unit into a plurality of zones capable of emitting light; or the sub-pixel units 201 may be formed by dividing a branch pixel unit into a plurality of emitting light zones. The branch pixel unit typically refers to an R, G, B or W branch pixel unit included in a pixel unit.

It shall be noted that in the foregoing respective embodiments, the ratio of display zones to non-display zones in slits of a grating can become more uniform and there can be periodically uniform brightness in the vertical direction (i.e., the column direction) to alleviate the Moire fringes in effect without any transverse displacement of each row of sub-pixel units 201 relative to a preceding row of sub-pixel units 201. Of course, further to the foregoing embodiment, there can be a transverse displacement, which is an irrational number multiple of the width of a sub-pixel unit, of each row of sub-pixel units 201 relative to a preceding row of sub-pixel units 201 without any influence on the effect of the invention.

Advantageous effects of the embodiments of the invention are as follows: the same row of sub-pixel units are inclined in the same direction, and the projection of the top side of each sub-pixel unit in the vertical direction lies on and overlaps with the bottom side of an adjacent sub-pixel unit, and the projection of the bottom side of the sub-pixel unit in the vertical direction lies on and overlaps with the top side of another adjacent sub-pixel unit, thereby resulting in periodically uniform brightness in the vertical direction (i.e., the column direction) when cooperating with the grating, alleviating the Moire fringes and improving a 3D display effect.

An embodiment of the invention provides a 3D display panel including two paired box substrates and liquid crystals arranged between the two paired box substrates, where one of the paired box substrates is the array substrate according to the foregoing embodiment of the invention.

Advantageous effects of the embodiment of the invention are as follows: the same row of sub-pixel units in the array substrate are inclined in the same direction, and the projection of the top side of each sub-pixel unit in the vertical direction lies on and overlaps with the bottom side of an adjacent sub-pixel unit, and the projection of the bottom side of the sub-pixel unit in the vertical direction lies on and overlaps with the top side of another adjacent sub-pixel unit, thereby resulting in periodically uniform brightness in the vertical direction (i.e., the column direction), alleviating the Moire fringes and improving a 3D display effect.

An embodiment of the invention provides a 3D display device including a grating configured to project different images respectively into the left eye and the right eye and including the 3D display panel according to the foregoing embodiment of the invention.

Advantageous effects of the embodiment of the invention are as follows: resulting in periodically uniform brightness in the vertical direction (i.e., the column direction), alleviating the Moire fringes and improving a 3D display effect.

Evidently, those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. An array substrate comprising:
   a plurality of sub-pixel units arranged in an array, wherein each of the sub-pixel units is a non-equilateral parallelogram having two short sides and two long sides, the two short sides form a top side and a bottom side of the non-equilateral parallelogram, and the sub-pixel units of the same row are inclined in the same direction,
   wherein top sides of the sub-pixel units in the same row along the horizontal direction lie on a first straight line, and bottom sides of the same sub-pixel units lie on a second straight line, and the projection of the top side of each of the sub-pixel units in a vertical direction lies on and overlaps with the bottom side of an adjacent sub-pixel unit, and the projection of the bottom side of the sub-pixel unit in the vertical direction lies on and overlaps with the top side of another adjacent sub-pixel unit;
   wherein for any two of the sub-pixel units, a straight line perpendicular to the top side of one of the two sub-pixel units intersects an end of the top side and a long side of the one of the two sub-pixel units opposite to the end to form a first line segment, and a straight line perpendicular to the top side of the other one of the two sub-pixel units intersects an end of the top side and a long side of the other one of the two sub-pixel units opposite to the end to form a second line segment,
   wherein a length of the first line segment is equal to a length of the second line segment, and wherein the end is a vertex of an obtuse angle adjacent to the top side, and
   wherein each one of the sub-pixel units is inclined in the same direction.

2. An array substrate, comprising:
   a plurality of sub-pixel units arranged in an array, wherein each of the sub-pixel units is a non-equilateral parallelogram having two short sides and two long sides, the two short sides form a top side and a bottom side of the non-equilateral parallelogram, and the sub-pixel units of the same row are inclined in the same direction,
   wherein top sides of the sub-pixel units in the same row along the horizontal direction lie on a first straight line, and bottom sides of the same sub-pixel units lie on a second straight line, and the projection of the top side of each of the sub-pixel units in a vertical direction lies on and overlaps with the bottom side of an adjacent sub-pixel unit, and the projection of the bottom side of the sub-pixel unit in the vertical direction lies on and overlaps with the top side of another adjacent sub-pixel unit,
   wherein for any two of the sub-pixel units, a straight line perpendicular to the top side of one of the two sub-pixel units intersects an end of the top side and a long side of the one of the two sub-pixel units opposite to the end to form a first line segment, and a straight line perpendicular to the top side of the other one of the two sub-pixel units intersects an end of the top side and a long side of the other one of the two sub-pixel units opposite to the end to form a second line segment;

wherein a length of the first line segment is equal to a length of the second line segment, and wherein the end is a vertex of an obtuse angle adjacent to the top side;

wherein an angle formed between a long side of the sub-pixel unit and a vertical line satisfies the following equation:

$\tan \theta = (L_1 + W)/H,$ wherein $\theta$ is the angle between the long side of the sub-pixel unit and the vertical line; L1 is the length of the top side or the bottom side of the sub-pixel unit; W is the distance between two adjacent ends of the top sides of the two adjacent sub-pixel units or the distance between two adjacent ends of the bottom sides of the two adjacent sub-pixel units; and H is the vertical distance between the top side and the bottom side of the sub-pixel unit; and the array substrate further comprises a first sub-pixel unit row and a second sub-pixel unit row;

wherein the vertical distance between the top side and the bottom side of each sub-pixel unit in the first sub-pixel unit row is $H_1$, the length of the top side or the bottom side of each sub-pixel unit in the first sub-pixel unit row is $L_{11}$, the distance between two adjacent ends of the top sides or the bottom sides of two adjacent sub-pixel units in the first sub-pixel unit row is $W_1$, and the angle between the vertical line and the long side of each sub-pixel unit in the first sub-pixel unit row is $\theta_1$; the vertical distance between the top side and the bottom side of each sub-pixel unit in the second sub-pixel unit row is $H_2$, the length of the top side or the bottom side of each sub-pixel unit in the second sub-pixel unit row is $L_{12}$, the distance between two adjacent ends of the top sides or the bottom sides of two adjacent sub-pixel units in the second sub-pixel unit row is $W_2$, and the angle between the vertical line and the long side of each sub-pixel unit in the second sub-pixel unit row is $\theta_2$;

wherein $\theta_1$ is not equal to $\theta_2$, $H_1$ is not equal to $H_2$, $L_{11}$ is not equal to $L_{12}$, $W_1$ is not equal to $W_2$, and $L_{11}+W_1$ is equal to $L_{12}+W_2$; or wherein $\theta_1$ is not equal to $\theta_2$, $H_1$ is equal to $H_2$, $L_{11}$ is not equal to $L_{12}$, $W_1$ is not equal to $W_2$.

3. The array substrate according to claim 2, wherein the sub-pixel units are inclined in the same direction.

4. The array substrate according to claim 2, wherein the sub-pixel units disposed in two adjacent rows are inclined in opposite directions.

5. The array substrate according to claim 1, wherein sub-pixel units in a first set of N adjacent rows are inclined in a first direction; and sub-pixel units in a second set of N adjacent rows are inclined in a second direction opposite to the first direction, wherein N is an integer greater than or equal to 2, and the second set is adjacent to the first set.

6. The array substrate according to claim 2, wherein sub-pixel units in a first set of N adjacent rows are inclined in a first direction; and sub-pixel units in a second set of N adjacent rows are inclined in a second direction opposite to the first direction, wherein N is an integer greater than or equal to 2, and the second set is adjacent to the first set.

7. The array substrate according to claim 1, wherein the sub-pixel units are branch pixel units of a pixel unit; or the sub-pixel units are formed by dividing a pixel unit or a branch pixel unit of the pixel unit into a plurality of zones capable of emitting light.

8. The array substrate according to claim 1, further comprising a black matrix arranged at a spacing between two adjacent sub-pixel units.

9. The array substrate according to claim 8, wherein a width of the black matrix between the two adjacent sub-pixel units is equal to a width of the spacing between the two adjacent sub-pixel units.

10. The array substrate according to claim 2, further comprising a black matrix arranged at a spacing between two adjacent sub-pixel units.

11. The array substrate according to claim 10, wherein a width of the black matrix between the two adjacent sub-pixel units is equal to a width of the spacing between the two adjacent sub-pixel units.

12. A 3D display panel, comprising two paired box substrates and liquid crystals arranged between the two paired box substrates, wherein one of the paired box substrates is an array substrate comprising:

a plurality of sub-pixel units arranged in an array, wherein each of the sub-pixel units is a non-equilateral parallelogram having two short sides and two long sides, the two short sides form a top side and a bottom side of the non-equilateral parallelogram, and the sub-pixel units of the same row are inclined in the same direction;

wherein top sides of the sub-pixel units in the same row along the horizontal direction lie on a first straight line, and bottom sides of the same sub-pixel units lie on a second straight line; and the projection of the top side of each of the sub-pixel units in a vertical direction lies on and overlaps with the bottom side of an adjacent sub-pixel unit, and the projection of the bottom side of the sub-pixel unit in the vertical direction lies on and overlaps with the top side of another adjacent sub-pixel unit; and wherein for any two of the sub-pixel units, a straight line perpendicular to the top side of one of the two sub-pixel units intersects an end of the top side and a long side of the one of the two sub-pixel units opposite to the end to form a first line segment, and a straight line perpendicular to the top side of the other one of the two sub-pixel units intersects an end of the top side and a long side of the other one of the two sub-pixel units opposite to the end to form a second line segment, wherein a length of the first line segment is equal to a length of the second line segment, and wherein the end is a vertex of an obtuse angle adjacent to the top side, and wherein each one of the sub-pixel units is inclined in the same direction.

13. A 3D display panel, comprising two paired box substrates and liquid crystals arranged between the two paired box substrates, wherein one of the paired box substrates is an array substrate comprising:

a plurality of sub-pixel units arranged in an array, wherein each of the sub-pixel units is a non-equilateral parallelogram having two short sides and two long sides, the two short sides form a top side and a bottom side of the non-equilateral parallelogram, and the sub-pixel units of the same row are inclined in the same direction;

wherein top sides of the sub-pixel units in the same row along the horizontal direction lie on a first straight line, and bottom sides of the same sub-pixel units lie on a second straight line; and the projection of the top side of each of the sub-pixel units in a vertical direction lies on and overlaps with the bottom side of an adjacent sub-pixel unit, and the projection of the bottom side of the sub-pixel unit in the vertical direction lies on and overlaps with the top side of another adjacent sub-pixel unit; and wherein for any two of the sub-pixel units, a straight line perpendicular to the top side of one of the two sub-pixel units intersects an end of the top side and a long side of the one of the two sub-pixel units opposite to the end to form a first line segment, and a straight line perpendicular to the top side of the other one of the two sub-pixel units intersects an end of the top side and a long side of the other one of the two sub-pixel units opposite to the end to form a second line segment, wherein a length of the first line segment is equal to a length of the second line segment, and wherein the end is a vertex of an obtuse angle adjacent to the top side, and wherein an angle formed between a long side of the sub-pixel unit and a vertical line satisfies the following equation:

$$\tan \theta = (L_1 + W)/H,$$

wherein $\theta$ is the angle between the long side of the sub-pixel unit and the vertical line; L1 is the length of the top side or the bottom side of the sub-pixel unit; W is the distance between two adjacent ends of the top sides of the two adjacent sub-pixel units or the distance between two adjacent ends of the bottom sides of the two adjacent sub-pixel units; and H is the vertical distance between the top side and the bottom side of the sub-pixel unit;

the array substrate further comprises a first sub-pixel unit row and a second sub-pixel unit row, wherein the vertical distance between the top side and the bottom side of each sub-pixel unit in the first sub-pixel unit row is $H_1$, the length of the top side or the bottom side of each sub-pixel unit in the first sub-pixel unit row is $L_{11}$, the distance between two adjacent ends of the top sides or the bottom sides of two adjacent sub-pixel units in the first sub-pixel unit row is $W_1$, and the angle between the vertical line and the long side of each sub-pixel unit in the first sub-pixel unit row is $\theta_1$; the vertical distance between the top side and the bottom side of each sub-pixel unit in the second sub-pixel unit row is $H_2$, the length of the top side or the bottom side of each sub-pixel unit in the second sub-pixel unit row is $L_{12}$, the distance between two adjacent ends of the top sides or the bottom sides of two adjacent sub-pixel units in the second sub-pixel unit row is $W_2$, and the angle between the vertical line and the long side of each sub-pixel unit in the second sub-pixel unit row is $\theta_2$; and wherein $\theta_1$ is not equal to $\theta_2$, $H_1$ is not equal to $H_2$, $L_{11}$ is not equal to $L_{12}$, $W_1$ is not equal to $W_2$, and $L_{11}+W_1$ is equal to $L_{12}+W_2$; or wherein $\theta_1$ is not equal to $\theta_2$, $H_1$ is not equal to $H_2$, $L_{11}$ is not equal to $L_{12}$, $W_1$ is not equal to $W_2$.

14. The 3D display panel according to claim 12, wherein the sub-pixel units are sub-pixel units of a pixel unit; or the sub-pixel units are formed by dividing a pixel unit or a sub-pixel unit of the pixel unit into a plurality of zones capable of emitting light.

15. A 3D display device, comprising a grating configured to project different images respectively into the left eye and the right eye, wherein the 3D display device comprises a 3D display panel comprising two paired box substrates and liquid crystals arranged between the two paired box substrates, wherein one of the paired box substrates is an array substrate comprising:

a plurality of sub-pixel units arranged in an array, wherein each of the sub-pixel units is a non-equilateral parallelogram having two short sides and two long sides, the two short sides form a top side and a bottom side of the non-equilateral parallelogram, and the sub-pixel units of the same row are inclined in the same direction;

wherein top sides of the sub-pixel units in the same row lie on a first straight line, and bottom sides of the sub-pixel units lie on a second straight line; and the projection of the top side of each of the sub-pixel units in a vertical direction lies on and overlaps with the bottom side of an adjacent sub-pixel unit, and the projection of the bottom side of the sub-pixel unit in the vertical direction lies on and overlaps with the top side of another adjacent sub-pixel unit; and wherein for any two of the sub-pixel units, a straight line perpendicular to the top side of one of the two sub-pixel units intersects an end of the top side and a long side of the one of the two sub-pixel units opposite to the end to form a first line segment, and a straight line perpendicular to the top side of the other one of the two sub-pixel units intersects an end of the top side and a long side of the other one of the two sub-pixel units opposite to the end to form a second line segment, wherein a length of the first line segment is equal to a length of the second line segment, and wherein the end is a vertex of an obtuse angle adjacent to the top side, and wherein each one of the sub-pixel units is inclined in the same direction.

16. The 3D display device according to claim 15, wherein an angle formed between a long side of the sub-pixel unit and a vertical line satisfies the following equation:

$$\tan \theta = (L_1 + W)/H,$$

wherein $\theta$ is the angle between the long side of the sub-pixel unit and the vertical line; L1 is the length of the top side or the bottom side of the sub-pixel unit; W is the distance between two adjacent ends of the top sides of the two adjacent sub-pixel units or the distance between two adjacent ends of the bottom sides of the two adjacent sub-pixel units; and H is the vertical distance between the top side and the bottom side of the sub-pixel unit.

17. The 3D display device according to claim 15, wherein the sub-pixel units are sub-pixel units of a pixel unit; or the sub-pixel units are formed by dividing a pixel unit or a sub-pixel unit of the pixel unit into a plurality of zones capable of emitting light.

* * * * *